No. 771,864. PATENTED OCT. 11, 1904.
F. L. EAGER.
MECHANICAL MOVEMENT.
APPLICATION FILED MAR. 7, 1903.
NO MODEL.
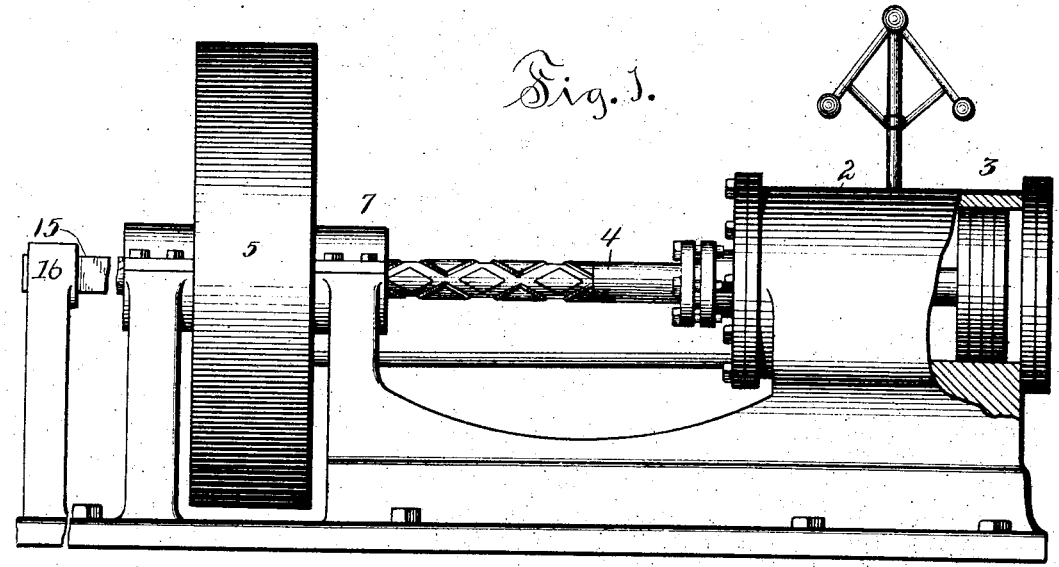
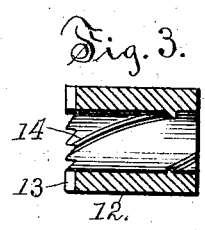
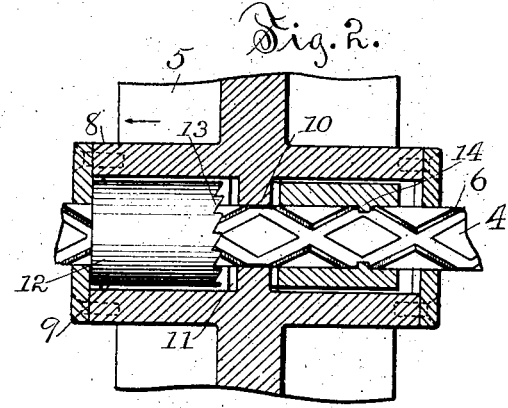
Witnesses:
Y. G. Campbell
A. P. Coffrin
Inventor:
Frank L. Eager,
by Jenkins & Barker,
Attorneys.

No. 771,864. Patented October 11, 1904.

UNITED STATES PATENT OFFICE.

FRANK L. EAGER, OF WATERBURY, CONNECTICUT.

MECHANICAL MOVEMENT.

SPECIFICATION forming part of Letters Patent No. 771,864, dated October 11, 1904.

Application filed March 7, 1903. Serial No. 146,673. (No model.)

*To all whom it may concern:*

Be it known that I, FRANK L. EAGER, a citizen of the United States, and a resident of Waterbury, in the county of New Haven and State of Connecticut, have invented certain new and useful Improvements in Mechanical Movements, of which the following is a specification.

My invention relates more especially to that class of engines in which the power is obtained by pressure exerted upon a piston located within a cylinder; and the object of my invention is to provide a device of this class in which the reciprocating movement of the piston shall be translated into a rotary movement, this power developed in the cylinder being maintained to a great degree, and also one in which greater movement of the rotating part is obtained by a predetermined movement of the piston; and a further object of my invention is to provide a device in which a fly or balance wheel will not be required.

A device by the use of which these objects may be attained is illustrated in the accompanying drawings, in which—

Figure 1 is a view in side elevation of an engine embodying my invention with parts broken away to show construction. Fig. 2 is a detail view in section through a portion of the pulley. Fig. 3 is a detail view, in central section, through one of the clutches.

In the accompanying drawings the numeral 1 indicates the bed of an engine provided with my improved driving means; 2, the cylinder; 3, the piston; 4, the piston-rod, and 5 a pulley to which rotary movement is imparted by the reciprocating movement of the piston. The cylinder and piston may be constructed in any ordinary manner and of any desired material as in prior devices of this class in which pressure is formed in the cylinder for the purpose of causing the piston to move back and forth therein. It will of course be understood that the usual devices for introducing the pressure medium into the cylinder may be employed.

The piston-rod 4 is provided with spirally-arranged grooves 6, that may exist in sets of two or more or singly, as desired. The groove or grooves of each set extend about the rod in an opposite direction from the grooves of the opposite set. This rod extends through the bearings 7, as shown in Fig. 1 of the drawings, and is of a size to permit free endwise movement through said bearings.

The hub 8 of the pulley 5 is provided on each end with chambers 9, which are partially divided by a flange 10. Ratchet-teeth 11 are preferably located on each side of this flange, and an opening is provided in the flange of a size to permit free endwise movement of the piston-rod 4 therein. A clutch 12 is located in each of the chambers 9, and each clutch is provided with ratchet-teeth 13, located on that end adjacent to the flange 10 and adapted to engage therewith. Each of these clutches is also provided with a spirally-arranged tongue 14, located in the grooves 6 in the piston-rod. The spirally-arranged tongue on each clutch extends in a different direction from that on the opposite clutch.

The end of the shaft 4 is of angular form, as shown at 15, and fits within a bearing 16 of similar form, that is employed to prevent a turning movement of the shaft. It will thus be seen by referring especially to Fig. 2 of the drawings that as the shaft is moved in the direction of the arrow the clutches 12 are forced toward the left, that in the chamber at the right-hand side or end of the hub 8 engaging the teeth on the right-hand side of the flange 10 and the opposite clutch being disengaged from the teeth on the flange in its chamber. This movement of the piston-rod will cause the clutch 12 to be rotated, carrying with it the pulley. On the return movement of the piston-rod 4 the engagement of a tongue 14 with one of the grooves 6 will carry said clutch out of engagement with the teeth on the flange 10, and a like engagement of the tongue on the clutch 12 in the chamber on the left-hand end of the hub of the pulley will cause said clutch to be carried with its teeth into engagement with the teeth on the left-hand side of the flange. The tongue in this clutch extending in the opposite direction from that in the other clutch will continue the rotation of the clutch in the same direction, the clutch translating the power to the pulley and maintaining its rotation. It will be noted that the construction will allow the pulley to rotate independent of the reciprocating movement of the piston-rod, the teeth of the clutches being thrown out of engagement with the teeth on the pulley should the reciprocation of the piston-rod lessen or cease. An ordinary steam-regulator may thus be used and connected with the pulley 5, and when said pulley attains a greater speed than that desired the shutting off of the steam will stop the operation of the piston and piston-rod, and thus avoid wear or use of any steam, as in devices where the piston-rod is tightly connected with the revolving part. The use of a balance or fly wheel is thus avoided, for the reason that the pulsations of the piston are not transmitted to the pulley at the extermities of the throw of the piston, as the pulley is disconnected from the piston when the rate of movement of the piston-rod lessens or ceases.

It will be understood that I do not limit myself to the precise construction above described, as it will be evident that variations from such construction may be made to a considerable extent and yet come within the scope of the invention, that consists of a cylinder in which is located a piston and two interengaging parts having intermeshing spirally-arranged grooves and tongues, one of said parts being rigidly connected to the piston, whereby its reciprocating movement is translated into a rotary movement of the opposite part.

It is obvious that other forms of clutches may be used, and I do not therefore limit myself to the precise form herein shown and described. Neither do I limit myself to the exact form of construction for preventing rotation of the reciprocating grooved member, as other forms equally applicable may be readily applied.

It will be noted that the device herein described employs what I call a "loose" connection between the rotating part and the piston-rod—that is, the piston-rod is used only to maintain the required speed, and as soon as this speed is exceeded the operation of the piston-rod will cease until the speed of the pulley becomes less than that required, as the ordinary form of device for regulating the admission of steam to the cylinder may be employed and connected to the pulley.

In the claims herein the term "rigid" connection has been employed to describe the connection between the piston and a rotating member, and by this term is meant any connection whereby the reciprocating movement of the piston is communicated to that part in engagement with the rotating member—that is, the movement of that part in engagement with the rotating member is coextensive with the movement of the piston.

What I claim as my invention, and desire to secure by Letters Patent, is—

1. In combination with a reciprocating member rigidly connected with its driving means, and having spirally-arranged grooves extending crosswise each of another, the driving means, a pulley mounted on the reciprocating member, and driving-clutches located within the pulley and having tongues extending into the spirally-arranged grooves.

2. In combination with a reciprocating member and a rotating member one of said parts having spirally-arranged grooves extending crosswise each of another, and one of said parts surrounding the other and having chambers; means connected with the reciprocating member for actuating it, clutches located in said chambers in the surrounding member, and with oppositely-disposed teeth on their ends adapted to engage the end walls of the chambers and tongues borne on the clutches and located in the spirally-arranged grooves.

3. In combination with a reciprocating member and a rotating member, one of said parts having spirally-arranged grooves extending crosswise each of another, and the other constituting a surrounding member having chambers; means connected with the reciprocating member for actuating it, clutches surrounding the shaft and having oppositely-disposed teeth on their adjacent ends to engage the toothed end wall of each chamber, and tongues on each clutch located in the spirally-arranged grooves.

FRANK L. EAGER.

Witnesses:
 ARTHUR B. JENKINS,
 ERMA P. COFFRIN.